United States Patent [19]
Amlee et al.

[11] Patent Number: 5,747,913
[45] Date of Patent: May 5, 1998

[54] ROTOR FOR HYBRID GENERATOR HAVING IMPROVED MAGNET RETENTION

[75] Inventors: Dale Alan Amlee, Indianapolis, Ind.; Michael Frank Matouka, Shelby Township, Mich.; Richard Allen Rausch; Keith Otipoby, both of Anderson, Ind.

[73] Assignee: General Motors Corporation, Detroit, Mich.

[21] Appl. No.: 757,120

[22] Filed: Dec. 3, 1996

Related U.S. Application Data

[63] Continuation-in-part of Ser. No. 440,410, May 12, 1995, abandoned.
[51] Int. Cl.⁶ ........................................ H02K 1/22
[52] U.S. Cl. .......................... 310/263; 310/156; 310/261
[58] Field of Search ........................ 310/156, 263, 310/261

[56] References Cited

U.S. PATENT DOCUMENTS

| | | | |
|---|---|---|---|
| 3,230,404 | 1/1966 | Graham | 310/263 |
| 3,411,027 | 11/1968 | Rosenberg | 310/263 |
| 5,270,605 | 12/1993 | Lefrancois et al. | 310/263 |
| 5,382,862 | 1/1995 | Ward et al. | 310/263 |
| 5,483,116 | 1/1996 | Kusase et al. | 310/263 |

FOREIGN PATENT DOCUMENTS

| | | |
|---|---|---|
| 5056616 | 3/1993 | Japan . |
| 2281665 | 3/1995 | United Kingdom . |

*Primary Examiner*—Steven L. Stephan
*Assistant Examiner*—Elvin G. Enad
*Attorney, Agent, or Firm*—Vincent A. Cichosz

[57] ABSTRACT

A hybrid alternator has a rotor with a plurality of permanent magnets disposed between opposing claw-pole segment pole fingers. The magnets are radially retained by the pole fingers during rotation. The magnets are supported during high speed rotation characterized by outward flexure of the pole fingers at surfaces inboard of extreme ends of the magnets thereby reducing load stresses on the magnet.

8 Claims, 7 Drawing Sheets

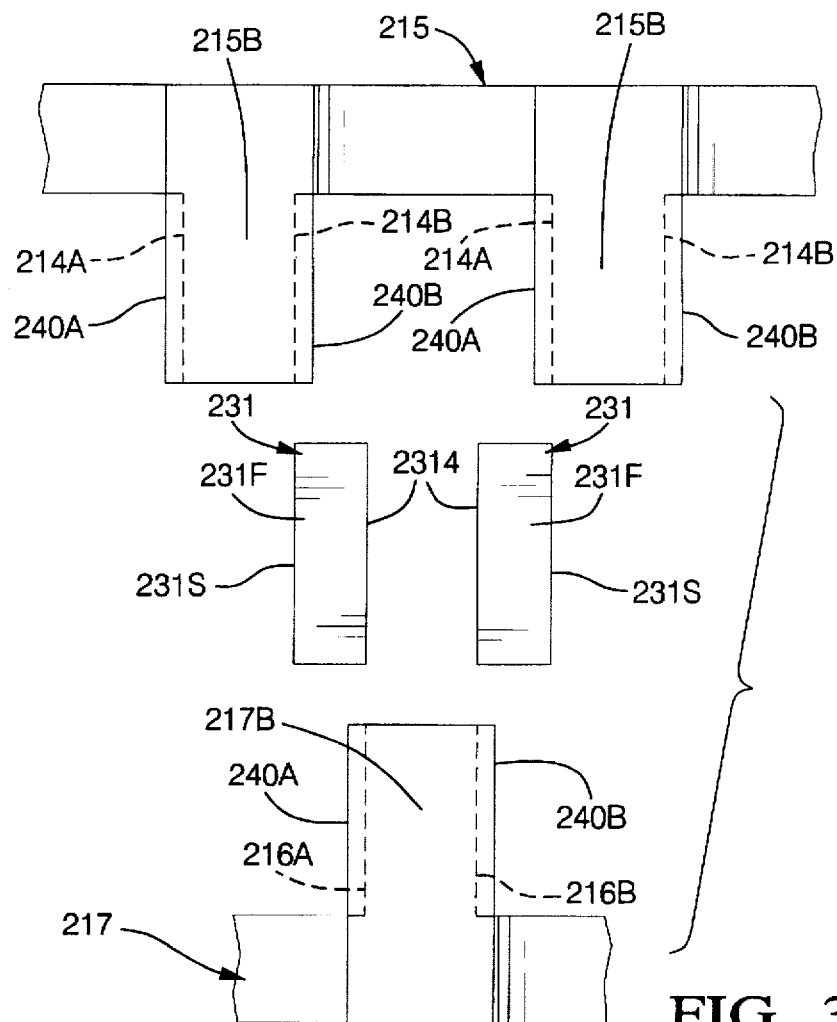
FIG. 3
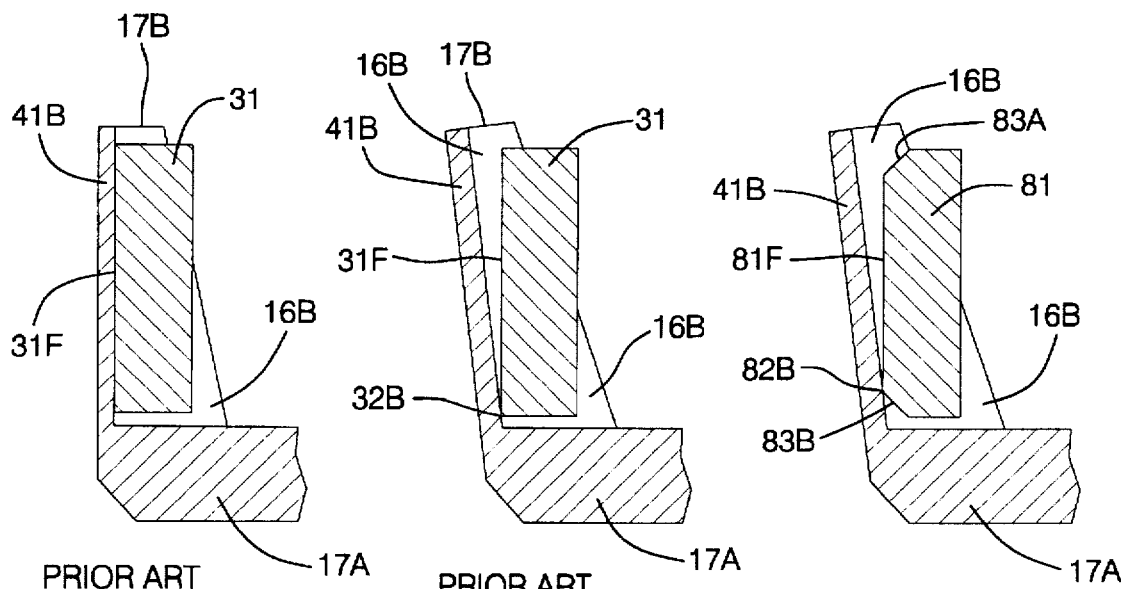
PRIOR ART
FIG. 4A
PRIOR ART
FIG. 4B
FIG. 5

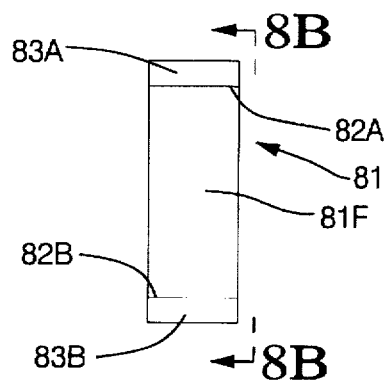
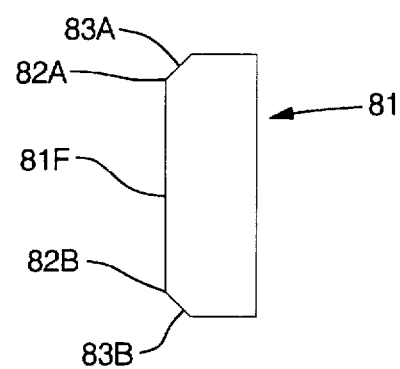
FIG. 8A　　　　　　　　FIG. 8B
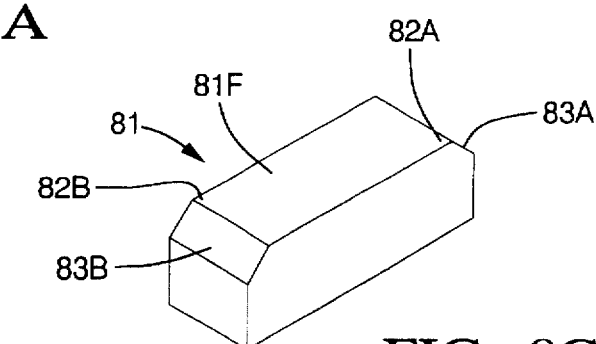
FIG. 8C
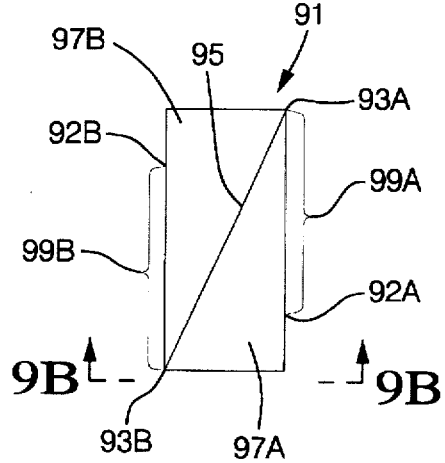
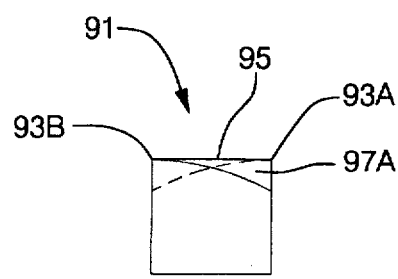
FIG. 9B
FIG. 9A
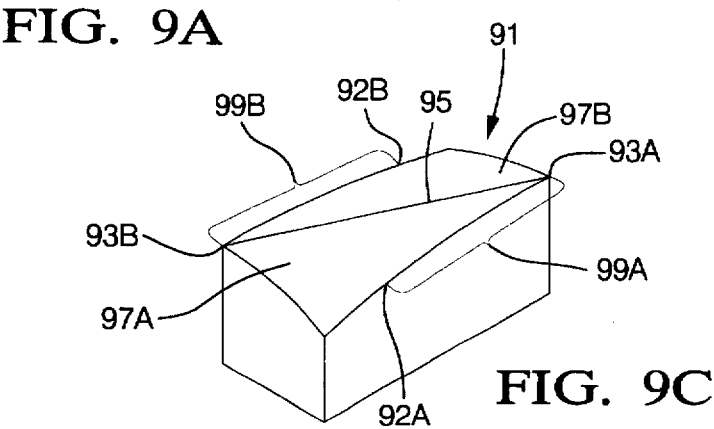
FIG. 9C 5,747,913

1

ROTOR FOR HYBRID GENERATOR HAVING IMPROVED MAGNET RETENTION

This is a continuation-in-part of application Ser. No. 08/440410 filed on 12, May 1995 now abandoned.

BACKGROUND OF THE INVENTION

This invention relates to alternating current generators and more specifically to alternating current generators having magnetic claw-pole segments, high-magnetic-strength permanent magnets interposed between adjacent pole fingers and a flux controlling field coil. Such alternating current generators are hereinafter referred to as hybrid generators.

Generally, a hybrid generator comprises a conventional stator including a multi-phase output winding and magnetic material laminations supported by a housing. Further, the hybrid generators utilize a Lundell rotor that is comprised of two claw-pole members having interleaved-pole fingers and a field coil surrounding a magnetic core therebetween the claw-pole members. The claw-pole members, magnetic core, and field coil are supported by a rotor shaft and are secured thereto. Opposite ends of the shaft are supported by bearings and the assembly is free to rotate within the stator with minimal clearance between the rotor and stator. Slip rings are secured to the shaft and in operation couple the field coil to a current source via contact brushes.

A plurality of high-magnetic-strength permanent magnets, such as Neodymium-Iron-Boron magnets, are disposed between adjacent claw-pole fingers to provide a field boost. When the field coil is not energized, the magnetic flux developed by the permanent magnets is shunted through the rotor assembly. However, when the field coil is energized, the magnetic flux developed by the permanent magnets additively contributes to flux across the stator/rotor air gap resulting from field coil excitation.

Various magnet retention systems for hybrid generators are known including retention brackets or additional locking hardware in addition to the already described hardware. Such systems disadvantageously contribute mass and assembly complexity.

Another known retention system relies upon a relatively thin shelf or ledge formed on each opposing side of a pair of adjacent opposing claw-pole fingers to contain the magnets. Examples of such magnet retention system are found in U.S. Pat. No. 4,959,577 to Radomski and assigned to the assignee of the present invention. High speed operation of a hybrid generator employing such a magnet retention system results in deformation of the claw-pole members which changes the loading on the magnets. Significant stress concentrations may result in fracturing of the permanent magnets, particularly where relatively brittle, low tensile strength, limited elasticity magnetic materials such as Neodymium-Iron-Boron are used. Relatively thin ledges, while advantageously locating the permanent magnets radially outward, present manufacturing challenges and high speed strength limitations.

SUMMARY OF THE INVENTION

Accordingly, a rotor in accordance with the present invention has a shaft supporting a pair of magnetic claw pole segments and a rotor core interposed therebetween. A field coil surrounds the rotor core. The claw pole segments have a plurality of pole fingers, the pole fingers from one claw pole segment being interleaved with the pole fingers from the other claw pole segment. A plurality of permanent magnets are individually interposed between a respective

2 pair of adjacent opposing pole fingers. Each permanent magnet is radially retained during rotation of the rotor by a respective pair of adjacent opposing pole fingers exerting a radial retaining forces on the magnet at reaction surfaces on the magnet. Flexure of the pole fingers occurs during rotation thereby altering the location and area characteristics of the reaction surfaces, the tendency being toward concentrating the radial retaining forces at extreme longitudinal ends of the permanent magnets. In accordance with the invention, the reaction surfaces when the pole fingers are flexed radially outward are established inboard of the longitudinal ends of the permanent magnets by cooperative geometries of the pole fingers and the magnets, thereby reducing bending moment stresses on the permanent magnets. In accordance with another aspect of the present, a non-magnetic cap is radially interposed between the magnet and claw poles to distribute compressive loads over a large region of the permanent magnet.

These and other features of the invention will become more apparent after reading the detailed description and studying the accompanying referenced drawings.

BRIEF DESCRIPTION OF THE DRAWINGS

FIG. 3 illustrates a disassembled view of a portion of a second rotor having opposing claw-pole members and associated magnets to which the present invention is related.

FIGS. 4A and 4B illustrate low and high speed effects upon conventional claw-pole members of a hybrid rotor.

FIG. 5 illustrates a general magnet retention system in accordance with the present invention.

FIGS. 8A–8C illustrate a magnet geometry in accordance with the present invention as shown in FIG. 5.

FIGS. 9A–9C illustrate another magnet geometry in accordance with the present invention.

DETAILED DESCRIPTION OF THE INVENTION

Details of operation and of much of the surrounding structure of a hybrid generator as herein described are generally well known to those skilled in the art and, therefore, the discussion herein is limited to only those features of the present invention necessary for an understanding thereof. The aforementioned U.S. Pat. No. 4,959, 577 to Radomski, however, provides exemplary contextual details as may be of general applicability.

Figure 1:
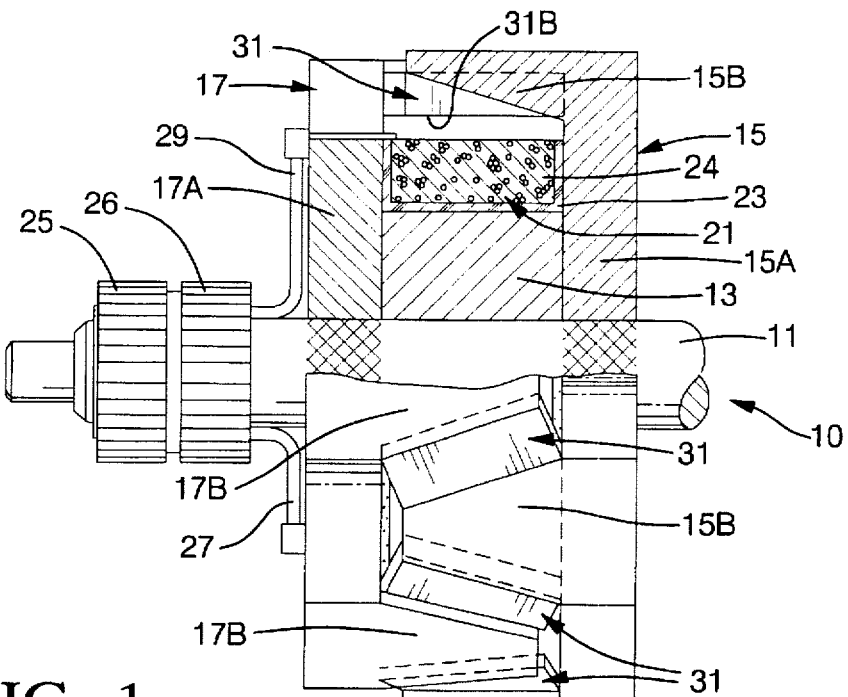
FIG. 1 illustrates a rotor of a hybrid generator showing generally a magnet and claw-pole member retention system to which the present invention is related.

Referring now to the drawings wherein like characters represent the same or corresponding parts throughout the several views, one representative form of a rotor assembly for application in a hybrid generator is designated by the numeral 10 in FIG. 1. The rotor is comprised of a shaft 11 that is supported for rotation by bearings (not shown) and coupled to a prime mover such as a motor vehicle engine via a pulley system and an accessory drive belt (also not shown). Rotor 10 further comprises claw-pole members 15 and 17 which are secured to shaft 11 to rotate therewith. A core 13 is also secured to shaft 11 intermediate claw-pole members 15 and 17. Claw-pole members 15,17, core 13 and shaft 10 are a magnetic material such as steel. In the drawing, core 13 is illustrated as an individual component piece, however, it is to be understood that the core of rotor 10 may be an integral axial extension of one or both claw-pole members.

About core 13 is field coil assembly 21 which is comprised of an insulative spool 23 and field coil 24. Alternatives to this established core and spool design are known, including one alternative for achieving improved heat conduction from the coil windings to the core as disclosed in U.S. Pat. No. 4,588,915 to Gold et al., also assigned to the assignee of the present invention. The ends of field coil 24 are coupled to respective slip rings 25 and 26, typically copper, via conductors 29 and 27 respectively. Slip rings 25,26 and conductors 29,27 likewise are secured to rotate with shaft 11, the flux generating direct current being delivered to the field coil 24 by a pair of brushes (not shown) contacting the slip rings.

Each claw-pole member 15,17 is substantially identical to the other, having respective hub sections 15A,17A and a plurality of respective pole fingers 15B,17B. The pole fingers extend axially from the hub sections bracketing the field coil assembly 21 and core 13 radially inwardly therefrom. The pole fingers of each claw-pole member further are symmetrically spaced around the perimeter of the hub section and as assembled onto the shaft 11 interleave in a non-contacting spaced relationship with the pole fingers of the other claw-pole member.

Figure 2:
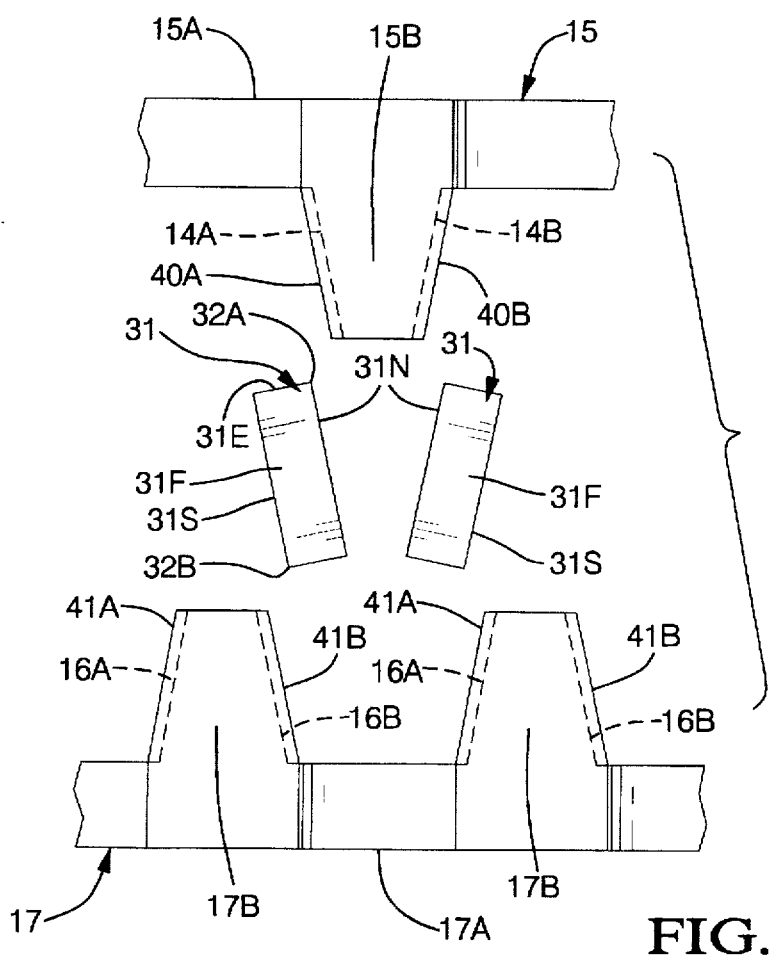
FIG. 2 illustrates a disassembled view of a portion of a first rotor having opposing claw-pole members and associated magnets to which the present invention is related.

FIG. 2 provides a disassembled view of the two claw-pole members and permanent magnet assembly wherein the curvature of those features is omitted for clarity and the illustration therefore represents those features as appearing as if the structures were straightened out across the page. Generally, the space therebetween a pair of adjacent interleaved pole fingers houses a permanent magnet, each of which is labeled 31. Permanent magnets 31 are generally rectangularly shaped with substantially flat faces. Each permanent magnet 31 has a pair of opposing pole faces 31N and 31S corresponding to north and south magnetic polarities respectively. These pole faces are immediately adjacent respective side surfaces of pole fingers 15B and 17B. All pole fingers 15B have respective side surfaces 14A,14B adjacent similar pole faces, 31N in the illustration. Likewise, pole fingers 17B have respective side surfaces 16A,16B adjacent the other similar pole faces, 31S in the illustration. Therefore, all pole fingers 15B have a north magnetic polarity and all pole fingers 17B have south magnetic polarity. Magnets 31 further have a substantially planar front face labelled 31F in the Figures which face radially outward from the rotor core. It is to be understood that length of the magnet refers to longitudinal length along the major axis substantially parallel with the magnet pole faces. Each magnet 31 has a pair of longitudinally opposite ends 31E.

The number of pole fingers on each claw-pole member equals six in the exemplary rotor structure, though more or less pole fingers may define the rotor structure. Each pole finger is generally V-shaped; that is to say, each pole finger is wider at the proximal end at the hub sections 15A,17A and tapered narrower at the distal end extending away from the respective hub section. Each pole finger 15B and 17B has a pair of respective side surfaces 14A,14B and 16A,16B and a corresponding pair of radial support ledges 40A,40B and 41A,41B which are substantially normal to the respective side surfaces. Claw-pole members of such geometry may be produced either by forming out of heavy gauge steel by compression molding with heavy piercing and forming equipment as is well known in the art or produced by forming out of compressed iron particles as taught, for example, in U.S. Pat. No. 5,382,862 assigned to the assignee of the present invention. The spaces between the interleaved pole fingers 15B and 17B define permanent magnet positions bounded by opposing respective side surfaces 14A, 16B and 14B,16A. Furthermore, respective radial support ledges 40A,41B and 40B,41A further define these positions. The combination of the opposing side surfaces and corresponding radial support ledges provides a channel for the permanent magnets having radial and circumferential boundaries for containment of the magnets 31. Each channel is skewed on a diagonal with respect to axial alignment due to the characteristic V-shape of the claw-pole members; adjacent channels skewed in opposite diagonal directions and alternating channels being skewed in the same diagonal direction.

The permanent magnets 31 are complementarily oriented and circumferentially spaced one from another with respect to the permanent magnet channels so as to nest therein. The magnet length aligns substantially parallel to the side surfaces of the claw-pole fingers defining the channel. Therefore, each magnet is skewed on a diagonal. Adjacent magnets are skewed in opposite diagonal directions and alternating magnets are skewed in the same diagonal direction. Magnets 31 may be part of a magnet assembly comprising a substantially ring-shaped carrier (not shown) surrounding the field coil assembly 21 and having magnets 31 secured thereto at the outer periphery thereof. Such a carrier assembly is described in detail in co-pending U.S. patent application Ser. No. 08/361,419 also assigned to the assignee of the present invention.

Referring now to FIG. 3, alternative geometries for rotor claw-pole members are illustrated. The claw-pole geometry is characterized by side surfaces and radial support ledges running substantially axially to thereby define axial permanent magnet channels. FIG. 3 provides a disassembled view of two claw-pole members and permanent magnet assembly wherein the curvature of those features is omitted for clarity and the illustration therefore represents those features as appearing as if the structures were straightened out across the page. It is apparent that the basic relationship between claw-pole members 215,217 is identical to that of a rotor assembly having claw-pole members with V-shaped pole fingers. That is to say the pole fingers 215B,217B interleave and pairs of opposing adjacent side surfaces 214A,216B and 214B,216A and corresponding pairs of radial support ledges 240A,241B and 240B,241A define the permanent magnet positions. The combination of the opposing side surfaces and corresponding radial support ledges provides a channel for the permanent magnets having radial and circumferential boundaries for containment of the magnets 231. Each channel, however, is seen to be axially aligned.

With channels oriented as described, orientation of the permanent magnets will be similar. Therefore, each magnet is aligned axially and is circumferentially spaced from the others. Permanent magnets 231 are generally rectangularly shaped with substantially flat faces. Each permanent magnet 231 has a pair of opposing pole faces 231N and 231S corresponding to north and south magnetic polarities respectively. These pole faces are immediately adjacent respective side surfaces on pole fingers 215B and 217B. All pole fingers 215B have respective side surfaces 214A,214B adjacent similar pole faces, 231S in the illustration. Likewise, pole fingers 217B have respective side surfaces 216A,216B adjacent the other similar pole faces, 231N in the illustration. Therefore, all pole fingers 215B have a south magnetic polarity and all pole fingers 217B have north magnetic polarity. The foregoing is generally well known to those skilled in the art.

It is generally understood that mass reduction, especially at the periphery of the rotor and more particularly at the distal end of claw-pole fingers, is desirable. Claw-pole finger mass reductions reduce bending moments thereby allowing for a smaller air gap between the rotor and stator as well as an extended upper speed. Furthermore, machine inertias are reduced along with rotor mass reductions. Therefore, preferred claw-pole members are characterized by the general V-shape as illustrated in FIGS. 1 and 2. Further illustration and description will therefore be limited to such a preferred claw-pole geometry in the exposition of the features of the present invention. Turning now to FIG. 4A, a schematic cross sectional view through a portion of a representative assembly of a permanent magnet 31 and one claw-pole finger 17B of a hybrid alternator rotor is shown. The sectional view is taken through magnet 31, support ledge 41B, claw-pole finger 17B and hub 17A of claw-pole member 17. The opposing claw-pole member 15 is not illustrated in FIG. 4A; however, it is to be understood that an opposing claw-pole finger adjacent claw-pole finger 17B provides magnet 31 with a second support ledge 40A. Further references herein to one support is to be considered applicable to both support ledges of a pair of opposing adjacent claw-pole fingers unless otherwise stated.

As shown in FIG. 4A, support ledge 41B is in contact with a portion of the front face 31F of magnet 31 immediately adjacent the side surface 16B of claw-pole finger 17B. At low rotational speeds, the area of front face 31F in contact with the support ledge 41B runs substantially the entire length of the magnet 31. This arrangement provides a distribution of the centripetal force applied to the magnet by the claw-pole finger over a substantial area and significantly along the entire length thereof. Portions of the magnet 31 in contact with the support ledges 41B,40A are hereafter generally referred to as centripetal reaction surfaces.

As rotational speed increases, claw-pole fingers experience elastic deformation due to the substantial centrifugal forces thereat. Such characteristic deformation is illustrated schematically in FIG. 4B through identical sections of the assembly illustrated in FIG. 4A. Like labels correspond to like features as between the Figures. High rotational speeds may result in significant radially outward flexure of the claw-pole finger 17B, the displacement generally being greatest at the free distal end of the finger and least at the fixed proximal end thereof as generally illustrated. High rotational speeds therefore result in partial loss of contact between the support ledge and the front face 31F of magnet 31 as shown. Essentially, the centripetal holding forces on the magnet are shifted to the extreme ends of the magnet. Because the front face 31F is assumed to be substantially planar, the load point shift occurs within a limited range of rotational speeds and can be conceptualized as occurring at a breakpoint speed significantly less than a maximum rotational speed. Therefore, 'high rotational speeds' or 'high speeds' as used herein shall refer to machine rotational speed exhibiting substantially high centripetal loading at the extreme ends of the magnet due to claw-pole finger flexure.

With such flexure, contact with the support ledge 41B no longer runs substantially the entire length of the magnet 31, thereby redefining the centripetal reaction surface in both area and location. Support ledge contact is reduced to a significantly lesser area on the front face 31F of the magnet and at substantially one extreme end thereof. This is referred to as the high-speed centripetal reaction surface and is generally designated by the numeral 32B in FIGS. 2 and 4B. Of course, the opposing claw-pole finger (15B of FIG. 2, not shown in FIG. 4B) undergoes similar deformation resulting in respective support ledge (40A of FIG. 2, not shown in FIG. 4B) contact with the magnet at substantially the other extreme end thereof and generally designated 32A in FIG. 2. It is also noted that the high-speed centripetal reaction surfaces 32A,32B are at opposite diagonal corners across the front face 31F of magnet 31. These significantly smaller centripetal reaction surfaces 32A,32B therefore carry a significantly concentrated load. The stresses on the magnet along the significant span between the centripetal reaction surfaces may result in fracturing of brittle magnetic material and premature failure of less brittle magnetic materials due to tensile stresses of repeated load cycles. Additionally, the load concentrations at the high-speed centripetal reaction surfaces may cause the magnet to fail due to compressive stresses after repetitive high-speed cycles.

Figure 6A:
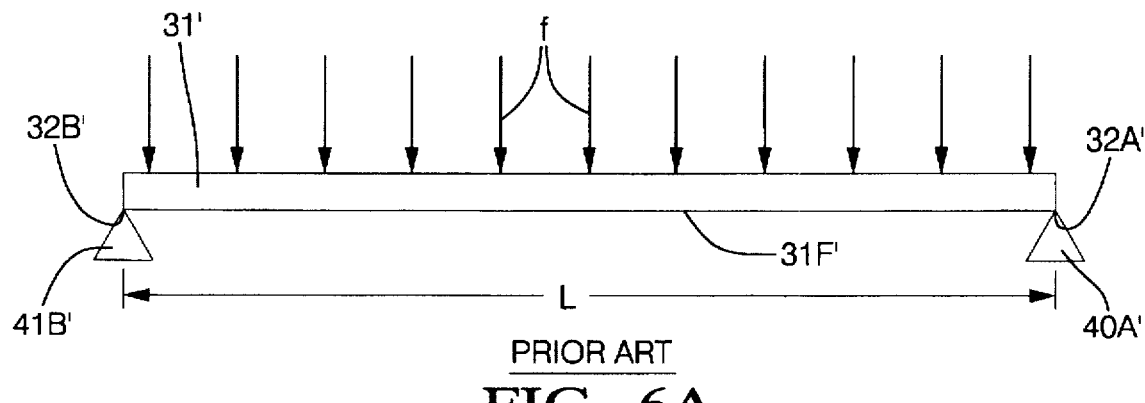
FIGS. 6A and 6B illustrate a demonstrative force balance analogue and bending moment plot respectively for a conventional magnet and claw-pole member geometry as illustrated in FIG. 4B.

Diagrams 6A and 6B illustrate the shortcomings of such extreme outboard locations of high-speed centripetal reaction surfaces. FIG. 6A illustrates a demonstrative force balance analogue of the high speed rotation situation as generally described with respect to FIG. 4B. Characters that are primed in FIG. 6A correspond to like un-primed characters of FIGS. 2 and 4B. A magnet is approximated as a uniform cross section beam 31' loaded uniformly along a length (L) which corresponds substantially to the length of the magnet 31. This is an approximation of the diagonal length between the two high-speed centripetal reaction surfaces of the magnet.

The arrows illustrate uniformly-distributed elemental centrifugal forces (f), only some of which are labeled for clarity. The summation of the elemental centrifugal forces is a net force equivalent in magnitude to the product of the mass of the magnet and its centripetal acceleration. Put another way, the net force is equivalent to the net centrifugal force of the magnet. The high-speed centripetal reaction surfaces are modeled as points 32A', 32B' at opposite ends of beam 31'. Respective opposing claw-pole finger support ledges are likewise modeled as points 41B', 40A' contacting the respective high-speed centripetal reaction surfaces 32A', 32B'.

Figure 6B:
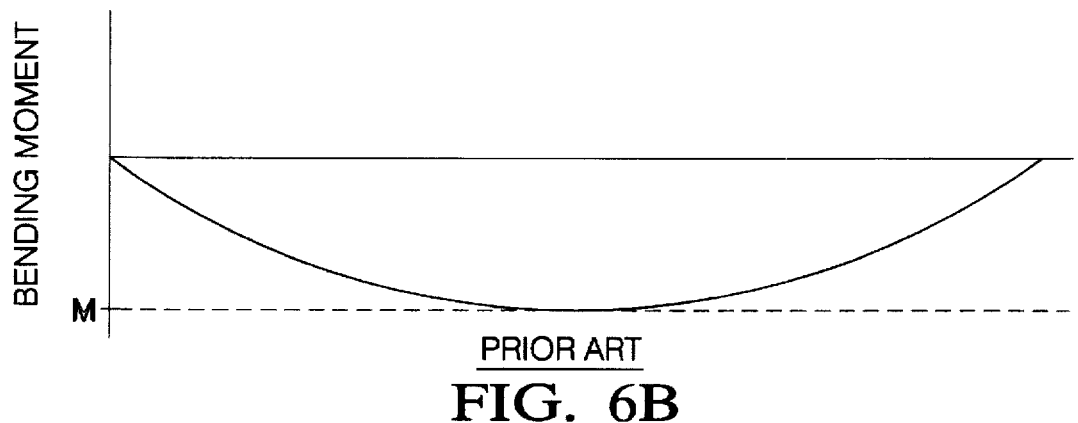

Such an arrangement produces bending moments along the length (L) of the beam 31' substantially as illustrated in corresponding FIG. 6B. A maximum bending moment (M) occurs at substantially the midpoint along the length (L) of the beam 31'. Location of the high-speed centripetal reaction surfaces 32A', 32B' at extreme ends of the beam 31' will produce a maximum bending moment (M) at substantially the midpoint therebetween. This is the typical load situation exhibited at high rotational speeds wherein the maximum bending moment occurs at substantially the midpoint along the length of the magnet.

Ideally, contact between support ledge 41B will run substantially the entire length of the magnet 31 throughout the operational speed range of the machine, thereby resulting in a consistent centripetal reaction surface that distributes the load substantially uniformly. This would result in inconsequential bending moments upon the magnet on an axis transverse to the length thereof and would distribute the compressive loads along a substantial surface of the magnet. However, accepting that the claw-pole fingers characteristically exhibit the general deformations as previously described, such an objective appears to be unobtainable without additional retaining hardware for constraining the claw-pole fingers.

In accordance with one general embodiment of the present invention, the bending moments are sought to be managed to acceptable levels by providing a first general magnet geometry. Referring now to FIGS. 5 and 8A–8C, a general magnet geometry in accordance with the present invention is illustrated. The portion of the illustration directed toward the claw-pole finger 17B of claw-pole member 17 is identical to that of FIG. 4B and is illustrated with respect to high rotational speed. Again it is to be understood that opposing claw-pole member 15 though not illustrated in the Figure provides an opposing claw-pole finger 15B adjacent claw-pole finger 17B to provide magnet 81 with a second support ledge 40A as hereinbefore generally described and illustrated.

Magnet 81 is illustrated in various views in FIGS. 8A–8C in addition to the sectional view of FIG. 5. Magnet 81 is seen to be substantially rectangular in shape owing to the general shape of the channel formed cooperatively by two opposing claw-pole fingers. The magnet has a pair of beveled corners 83 adjacent front face 81F thereof. Front face 81F therefore has a length less than the full length of the magnet. During low rotational speeds, support ledge 41B is in contact with a portion of the front face 81F of magnet 81 immediately adjacent the side surface 16B of claw-pole finger 17B. At low rotational speeds, the area of front face 81F in contact with the support ledge 41B runs substantially the entire length of the front face 81F.

As previously set forth, when rotational speed increases, claw-pole fingers experience elastic deformation due to the substantial centrifugal forces, mass and geometry of the claw-pole fingers as illustrated in FIG. 5. Though not illustrated, opposing claw-pole finger (15B of FIG. 2) undergoes similar deformation. Therefore, contact with the support ledges 41B,40A no longer runs substantially the entire length of the front face 81F, thereby redefining the centripetal reaction surface in both area and location. The high-speed centripetal reaction surfaces are generally designated 82A,82B in FIGS. 5 and 8A–8C and essentially comprise only a small area at the respective corners on the front face of the magnet.

Figure 7A:
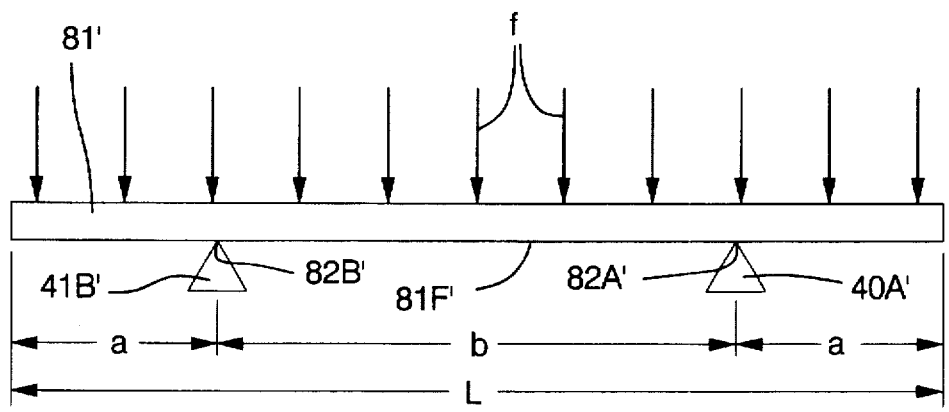
FIGS. 7A and 7B illustrate a demonstrative force balance analogue and bending moment plot respectively for a magnet retention system in accordance with the present invention.

FIG. 7A illustrates the high speed rotation situation as generally described with respect to FIGS. 5 and 8A–8C. Again, a demonstrative force balance analogue is set forth wherein primed characters correspond to like un-primed characters of FIGS. 5 and 8A–8C. Magnet 81 is approximated as a uniform cross section beam 81' loaded uniformly along a length (L) which substantially corresponds to the length of the magnet 81.

Figure 7B:
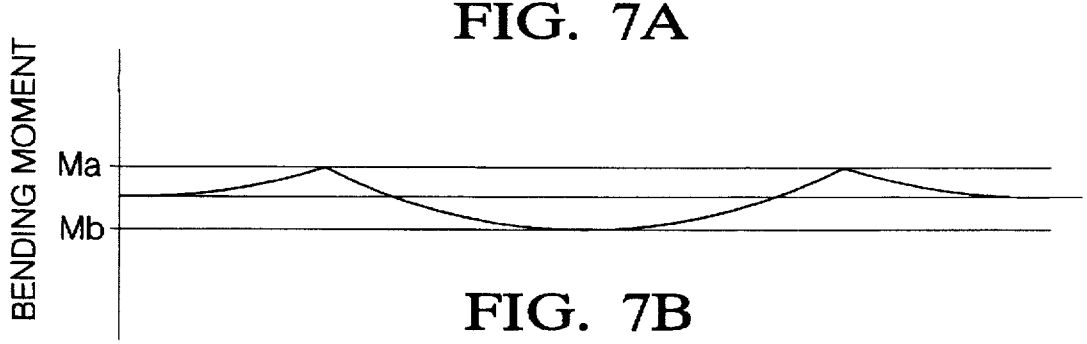

The arrows illustrate uniformly-distributed elemental centrifugal forces (f), the summation of which is equivalent to the net centrifugal force of the magnet. The high-speed centripetal reaction surfaces 82A,82B are modeled as points 82A',82B' toward opposite ends of beam 81'. These surfaces 82A',82B' are inboard from the extreme ends of the beam 81'. Respective opposing claw-pole finger support ledges are likewise modeled as points 41B',40A' contacting the respective high-speed centripetal reaction surface 82A',82B'. The linear distance between the centripetal reaction surfaces 82A',82B' is substantially equivalent to the length of the front face 81F and is labeled (b) in the Figure. This length is an approximation of the length between the two high-speed centripetal reaction surfaces of the magnet 81. The linear distance between each high-speed centripetal reaction surface 82A',82B' and the respective end of the magnet is labeled (a) in the Figure. Such an arrangement produces bending moments along the length (L) of beam 81' as illustrated in corresponding FIG. 7B. Local maximum bending moments occur at substantially the midpoint between the high-speed centripetal reaction surfaces 82A',82B' (labeled Mb) and at the location of the high-speed centripetal reaction surfaces 82A',82B' (labeled Ma). Location of the high-speed centripetal reaction surfaces 82A',82B' at positions where the distances (a) are substantially equivalent to 0.207*L will produce substantially magnitudinally equivalent bending moments Ma and Mb. These bending moments Ma and Mb where the distances (a) are substantially 0.207*L are also minimized for the given rotational speed. Deviation in the distance (a) from substantially 0.207*L will result in the increase of at least one of the local maximum bending moments Ma or Mb. This ratiometric relationship between the inboard distance (a) of the support point and overall length (L) of a magnet is considered to be universally true and the teachings of FIGS. 7A and 7B may be applied generally to other magnet shapes at later points in this disclosure. Location of the centripetal reaction surfaces at substantially 0.207*L is referred to herein as the symmetrical moment support position.

Figure 13:
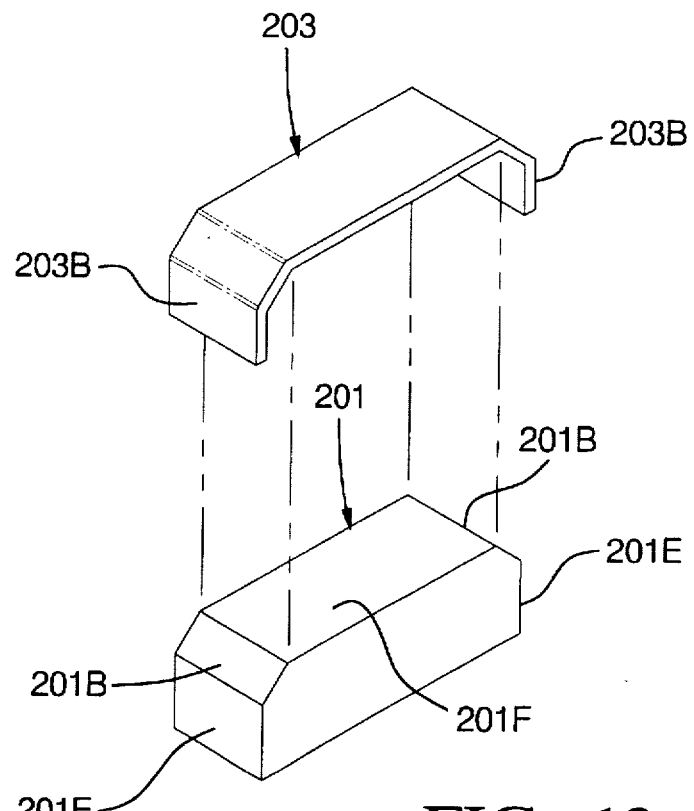
Figure 14:
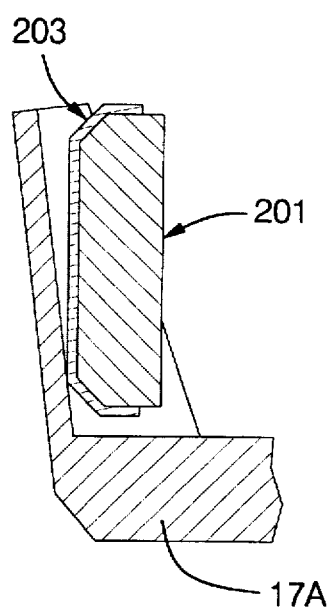

It may be apparent that during high-speed operation the magnet experiences substantially concentrated loads at the diagonally opposite centripetal reaction surfaces as described. Some magnetic material may, after repetitive high-speed cycles, crack, break or spall in the local area generally associated with the centripetal reaction surfaces. Therefore, in accordance with an alternative embodiment of the present invention, a load distribution cap is disposed between the magnet and claw pole fingers to distribute the load over a greater area thus reducing the compressive load concentration. FIGS. 13 and 14 illustrate an exemplary load distribution cap and preferred magnet geometry. The magnet 201 has a geometry substantially similar to the magnet 81 previously described with respect to FIGS. 8A–8C. The load distributing cap, generally labeled 203 in the figures, is formed to fit over the front face 201F and to extend partially over the magnets longitudinally opposite ends 201 E and beveled edge surfaces 201B. The load distribution cap is further open at the sides corresponding to the respective pole fingers of the rotor segments. The extensions 203B generally do not provide any load distributing advantages; however, they may significantly reduce bowing of the cap and are therefore preferably incorporated.

An important feature of the load distribution cap 203 is that it must not shunt the magnetic flux and therefore must be formed of a non-magnetic material. Additionally, the material characteristics must be such that it flows under the compressive force of the rotor yet not yield enough to escape the rotor. A preferred material is 3003 series aluminum.

The preferred geometry illustrated in FIGS. 13 and 14 are exaggerated for clarity. In one example, the overall magnet length is approximately 23 mm, the circumferential width approximately 11 mm and radial thickness approximately 6 mm. Beveled surfaces 201B are tapered from approximately 4.6 mm from each end at an angle of substantially 5 degrees. Additionally, both the upper and lower faces of the magnet may be beveled to provide a substantially symmetrical magnet to provide for an additional degree of assembly freedom.

In accordance with another general embodiment of the present invention, the bending moments are sought to be managed to acceptable levels by providing a second general magnet geometry. Referring to FIGS. 9A–9C showing magnet 91 in plan, end and isometric views respectively, a general magnet geometry in accordance with the present invention is illustrated. Magnet 91 is again seen to be substantially rectangular in shape owing to the general shape of the channel formed cooperatively by two opposing claw-pole fingers.

Magnet 91 has a pair of convex beveled surfaces 97A,97B sloping from the diagonal 95 across a pair of opposing corners 93A,93B such that the surface of the magnet interfacing with the support ledge of a respective claw-pole finger at low rotational speed is substantially toward a respective one of the opposing corners 93A,93B. Lower rotational speeds exhibit support of the magnet 91 at the distal ends of the claw-pole fingers. As rotational speed increases, deformation of the claw-pole fingers causes the centripetal reaction surfaces to shift from the opposing corners 93 toward respective opposite ends of the magnet.

In contrast to the magnet geometry of FIGS. 8A–8C, the convex beveled surface provides for a more gradual shift in position of the centripetal reaction surface in accordance with the rotational speed of the machine as opposed to a more abrupt shift associated with a breakpoint speed. Furthermore, the shift is substantially along a continuum of adjacent centripetal reaction surfaces 99A,99B from the opposing corners 93A,93B at low speed to a terminal high-speed centripetal reaction surface 92A,92B at the maximum rotational speed of the machine. Therefore, as the rotational speed changes within a range of operational speeds, so too does the location of the centripetal reaction surface on the magnet 91. It follows that the location of local maximum bending moments at the centripetal reaction surfaces and distributions of bending moments along the length of magnet 91 will also vary thereby alleviating repetitive stress concentrations such as would be experienced with static locations of high-speed centripetal reaction surfaces (e.g. high-speed centripetal reaction surfaces 82A,82B of FIGS. 5 & 8A–8C). Put another way with reference to the force balance analogue of FIG. 7A, the distances (a) and (b) with respect to overall magnet length change with rotational speed as too will the location of at least the local maximum bending moments (Ma).

The terminal high-speed centripetal reaction surfaces 92A,92B which essentially are the furthest outboard centripetal reaction surface locations are determined by the particular convexity characteristics of the magnet. It may be desirable that the terminal surfaces 92A,92B be outboard or inboard the symmetrical moment support position (a=0.207*L) requiring relatively shallow and deep convexity respectively. The former positioning may be preferred for example where the maximum rotational speed is typically transient or of limited duration, thereby minimizing stresses on the magnet during the predominant operational speeds of the machine.

Figure 10A:
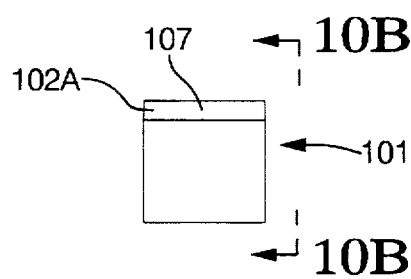
FIGS. 10A–10C illustrate yet another magnet geometry in accordance with the present invention.
Figure 10B:
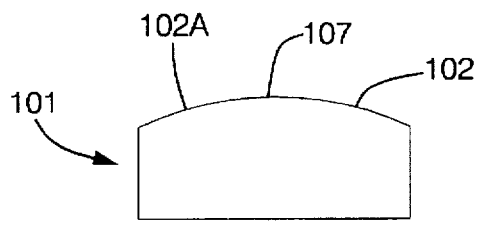
Figure 10C:
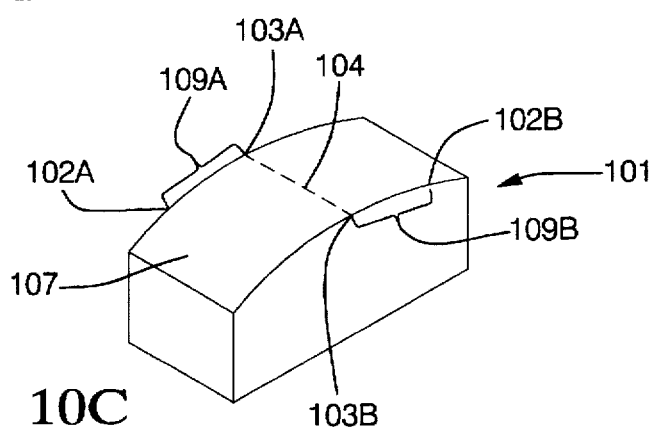

Another embodiment of the present invention is illustrated in the various views of FIGS. 10A–10C wherein magnet 101 is shown in end, side and isometric views respectively. Magnet 101 has a convex surface 107 sloping from an apex axis 104 central and transverse to the length of the magnet. The surface of magnet 101 interfacing with the support ledge of a respective claw-pole finger at low rotational speed is substantially at opposing sides of the magnet at the apex axis (103A,103B). As rotational speed increases, deformation of the claw-pole fingers causes the centripetal reaction surfaces to shift from the apex axis 104 at 103A, 103B toward opposite ends of the magnet 101.

The convex surface provides for a gradual shift in position of the centripetal reaction surface in accordance with the rotational speed of the machine substantially along a continuum of adjacent centripetal reaction surfaces 109A,109B from the apex 104 at low speed to a terminal high-speed centripetal reaction surface 102A,102B at the maximum rotational speed of the machine. Therefore, it can be appreciated that magnet 101 dynamics are functionally similar to those of magnet 91.

Figure 11A:
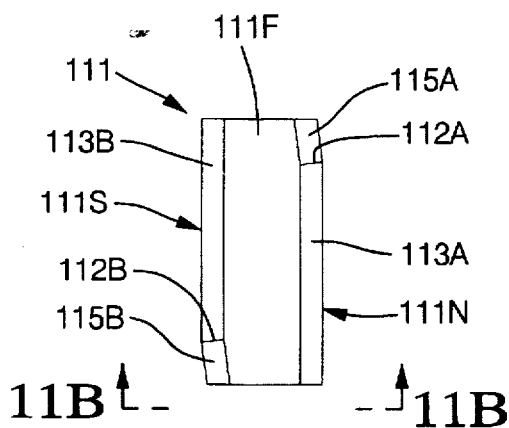
FIGS. 11A–11C illustrate still another magnet geometry in accordance with the present invention.
Figure 11B:
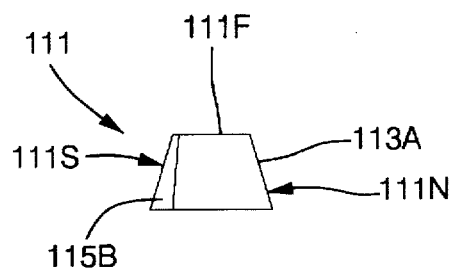
Figure 11C:
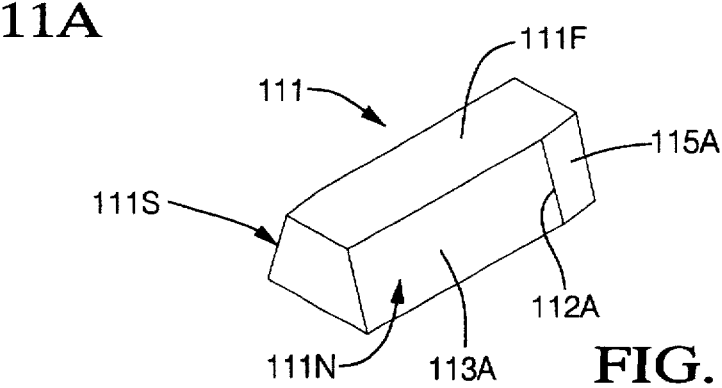

FIGS. 11A–11C illustrate yet another alternative embodiment of the present invention exhibiting additional magnet stabilizing features. FIGS. 11A–11C show magnet 111 in plan, end and isometric views respectively. Magnet 111 has non-parallel opposing pole faces 111S,111N. Pole faces 111S,111N have respective major tapered surfaces 113A, 113B and minor tapered/beveled surfaces 115A,115B. Major tapered surfaces 113 are tapered down and away from front face 111F parallel the magnet major axis such that a cross section taken through the magnet on a plane perpendicular to its major axis is substantially trapezoidal. Minor tapered/beveled surfaces 115, located toward opposite ends of magnet 111, likewise are tapered down and away from front face 111F and additionally are beveled inward toward the magnet major axis.

Such magnet geometry requires modifications of claw-pole finger geometry to cooperate therewith. The support ledges discussed up to this point are eliminated by side surfaces which are tapered complementarily to the major tapered surfaces 113 of magnet 111. Therefore, during low speed operation the centripetal reaction surfaces comprise the major tapered surfaces 113 along substantially the entire surface thereof. This has a centering effect on magnet 111 with respect to the opposing side surfaces of opposing adjacent claw-pole fingers. During high rotational speeds, magnet 111 contact with the support side surfaces of the claw-pole fingers is substantially reduced to the surface at the interface of the respective major and minor surfaces, also referred to as the high-speed centripetal reaction surfaces 112A, 112B.

The embodiment as exemplified with respect to FIGS. 11A–11C overcome certain shortfalls of the previously described embodiments as related to the support ledges of claw-pole fingers. As rotational speed increases, so too does the load on the support ledges. The embodiments wherein support ledges comprise part of the magnet retention system have force concentrations at substantially two small areas —one per each opposing claw-pole finger support ledge— which require a substantially thick support ledge in order to adequately manage the stresses. This disadvantageously may result in thinner magnets and/or less than optimal radial positioning thereof (i.e. radially inboard). The embodiment exemplified by FIGS. 11A–11C allows for full radially outward positioning of the magnets without the support ledge concerns mentioned. However, such a design is intolerant of dimensional tolerance stack-up including magnet dimensions and taper angles and claw-pole member dimensions and side surface angles thereby making the assembly susceptible to variations in the radial position of the magnet.

Figure 12A:
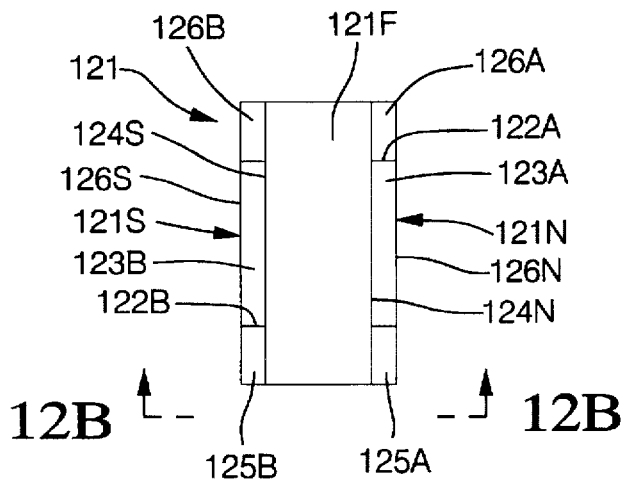
FIGS. 12A–12C illustrate another magnet geometry in accordance with the present invention.
Figure 12B:
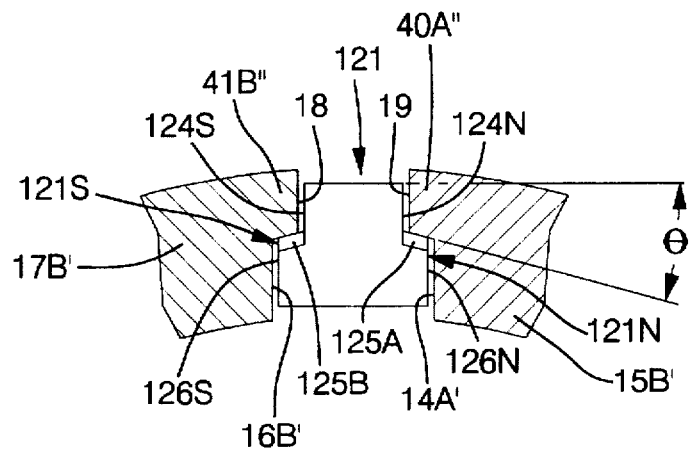
Figure 12C:
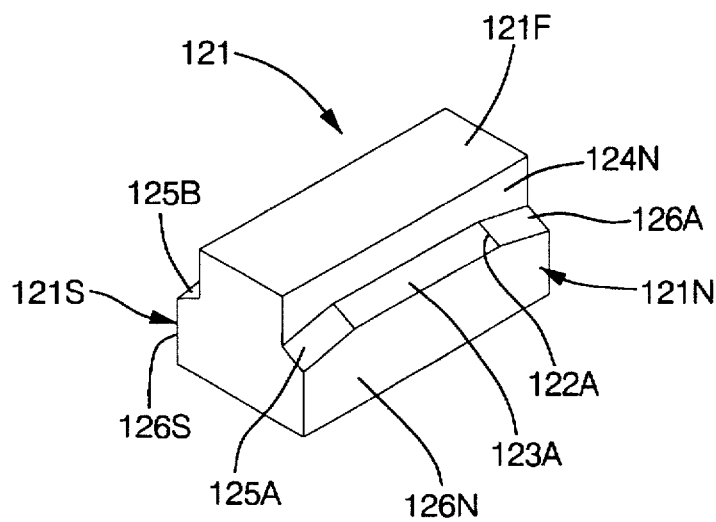

Turning now to FIGS. 12A–12C, a preferred magnet geometry provides for yet another embodiment of the invention, and one which benefits from various features of previously described magnet geometries. FIG. 12A shows a plan view and FIG. 12C shows an isometric view of magnet 121. FIG. 12B shows an end view of magnet 121 and sectional views of a pair of adjacent opposing claw-pole fingers 17B', 15B' flanking magnet 121 in an assembled orientation. Magnet 121 cross section (not shown) taken through the magnet on a plane perpendicular to its major axis is substantially an inverted "T" as oriented in the illustrations with a major horizontal portion and a major vertical portion. Magnet 121 steps down approximately one-half its front to back thickness from front face 121F along the magnet length to major sloped surfaces 123A, 123B which slope down and away from the vertical portion of the inverted "T" and are substantially parallel with the major axis of the magnet. At the ends of each sloped surface 123A,123B are minor sloped surface 125A,125B,126A, 126B cut back toward the magnet major axis essentially chamfering the corners of the horizontal portion of the inverted "T". While the chamfer is required only on one pair of diagonally opposing corners of the magnet, the symmetry of the fours corners being chamfered allows for non-indexed assembly where magnetization of the magnets is performed after assembling the magnets into the rotor or onto a carrier as earlier described.

Opposing pole faces 121S,121N are each comprised of the two noncoplanar but substantially parallel surfaces 124, 126. Such magnet geometry requires modifications of claw-pole finger geometry to cooperate therewith. The support ledges 41B", 40A" in this embodiment are substantially one-half the front to back thickness of magnet 121 and are sloped obtusely with respect to the respective side surfaces to complement the major sloped surfaces 123A,123B of magnet 121A. The opposing edges 18,19 of respective support ledges 41B", 40A" are immediately adjacent pole face surfaces 124S,124N respectively. Similarly, side surfaces 16B', 14A' are immediately adjacent pole face surfaces 126S,126N respectively.

During low speed operation the centripetal reaction surfaces comprise the major sloped surfaces 123A,123B along substantially the entire surface thereof. This has a centering effect on magnet 121 with respect to the opposing side surfaces of opposing adjacent claw-pole fingers. The angle (theta) defining the slope from the front face 121F plane is substantially 15 degrees in the present exemplary embodiment, however, more or less slope may be desirable in accordance with such variables as magnetic strength and surface quality of the support ledges and magnets. However, it is generally to be understood that increases in the slope angle will result in increasing intolerance to dimensional tolerance stack-up as previously described with respect to the embodiment of FIGS. 11A–11C.

During high rotational speeds, magnet 121 contact with the support ledge surfaces of the claw-pole fingers is substantially reduced to the surface at the interface of the respective major and minor tapered surfaces, also referred to as the high-speed centripetal reaction surfaces 122A, 122B.

As can be appreciated from the present embodiment, the cooperative geometries of magnet 121 and the claw-pole fingers 17B',15B' provide for substantial magnetic material to be in the preferred radial outboard position. Furthermore, the sloped surfaces of the magnet and claw-pole support ledges have a desirable centering effect upon the magnet. The substantial thickness of the support ledges are adequately dimensioned to manage the stresses thereon during high speed operation.

While the invention has been described in terms of certain preferred embodiments, it is anticipated that various modifications and alternative embodiments will be apparent to those skilled in the art and thus the scope of the invention is intended to encompass such modifications and alternative embodiments in accord with the claims as follows.

The embodiments of the invention in which an exclusive property or privilege is claimed are defined as follows:

1. A rotor assembly for a hybrid alternator comprising: a shaft, first and second claw-pole segments formed of magnetic material carried by said shaft, said first claw-pole segment having a plurality of first circumferentially spaced and axially extending pole fingers, said second claw-pole segment having a plurality of second circumferentially spaced and axially extending pole fingers, said first and second claw-pole segments oriented on said shaft such that said pole fingers of said first and second claw-pole segments are interleaved in spaced relationship, a rotor core formed of magnetic material carried by said shaft interposed between said claw-pole segments having opposite ends respectively engaging said claw-pole segments, a field coil disposed about said rotor core, and a plurality of permanent magnets, each permanent magnet having a pair of longitudinally opposite ends and interposed between a respective pair of adjacent opposing pole fingers, each pole finger engaged during rotation of the rotor with a respective permanent magnet at a retention interface between each pole finger and the respective permanent magnet, the permanent magnets being shaped to ensure that radially outward flexure of the pole fingers results in the retention interfaces being established at areas longitudinally inboard from said longitudinally opposite ends of the permanent magnets.

2. A rotor assembly for a hybrid alternator comprising: a shaft, first and second claw-pole segments formed of magnetic material carried by said shaft, said first claw-pole segment having a plurality of first circumferentially spaced and axially extending pole fingers, said second claw-pole segment having a plurality of second circumferentially spaced and axially extending pole fingers, said pole fingers having first and second side surfaces, each of said side surfaces having a respective permanent magnet support ledge extending therefrom, said first and second claw-pole segments oriented on said shaft such that said pole fingers of said first and second claw-pole segments are interleaved in spaced relationship, a rotor core formed of magnetic material carried by said shaft interposed between said claw-pole segments having opposite ends respectively engaging said claw-pole segments, a field coil disposed about said rotor core, and a plurality of permanent magnets, each permanent magnet having a pair of longitudinally opposite ends and interposed between respective side surfaces of a respective pair of adjacent opposing pole fingers, said permanent magnet support ledge of each pole finger engaged during rotation of the rotor with a respective permanent magnet at a retention interface between each support ledge and the respective permanent magnet, the permanent magnets being shaped to ensure that radially outward flexure of the pole fingers results in the retention interfaces being established at areas longitudinally inboard from said longitudinally opposite ends of the permanent magnets.

3. A rotor assembly for a hybrid alternator as claimed in claim 2 wherein each permanent magnet has a portion thereof interposed between the support ledges of the respective pair of adjacent opposing pole fingers.

4. A rotor assembly for a hybrid alternator as claimed in claim 2 further comprising a plurality of load distributing caps, each one of said plurality of load distributing caps being radially interposed between respective ones of said plurality of permanent magnets and respective pairs of adjacent opposing pole fingers.

5. A rotor assembly for a hybrid alternator as claimed in claim 4 wherein each respective one of said plurality of load distributing caps is characterized by a portion radially interposed between respective ones of said plurality of permanent magnets and respective pairs of adjacent opposing pole fingers and a pair of substantially radially inward extensions wrapping the respective pair of longitudinally opposite ends of said respective ones of said plurality of permanent magnets.

6. A rotor assembly for a hybrid alternator as claimed in claim 2 wherein each one of said plurality of permanent magnets is substantially rectangular with each one of said pair of longitudinally opposite ends being beveled radially inward.

7. A rotor assembly for a hybrid alternator as claimed in claim 6 further comprising a plurality of load distributing caps wherein each respective one of said plurality of load distributing caps is characterized by a portion radially interposed between respective ones of said plurality of permanent magnets and respective pairs of adjacent opposing pole fingers and a pair of substantially radially inward extensions wrapping the respective pair of longitudinally opposite ends of said respective ones of said plurality of permanent magnets.

8. A rotor assembly for a hybrid alternator comprising:

shaft, first and second claw-pole segments formed of magnetic material carried by said shaft, said first claw-pole segment having a plurality of first circumferentially spaced and axially extending pole fingers, said second claw-pole segment having a plurality of second circumferentially spaced and axially extending pole fingers, said first and second claw-pole segments oriented on said shaft such that said pole fingers of said first and second claw-pole segments are interleaved in spaced relationship, a rotor core formed of magnetic material carried by said shaft interposed between said claw-pole segments having opposite ends respectively engaging said claw-pole segments, a field coil disposed about said rotor core, and a plurality of permanent magnets, each permanent magnet having a pair of longitudinal opposite ends and interposed between a respective pair of adjacent opposing pole fingers, said pole fingers characterized by a first degree of radially outward flexure during a first range of rotational speeds and a second degree of radially outward flexure during a second range of rotational speeds, each pole finger engaged during said first range of rotational speeds with a respective permanent magnet to exert a radial retaining force at a first reaction surface on the respective permanent magnet and engaged during said second range of rotational speeds with said respective permanent magnet to exert a radial retaining force at a second reaction surface on the respective permanent magnet, the permanent magnets being shaped to ensure that said second reaction surfaces are established at areas longitudinally inboard from said longitudinally opposite ends of the permanent magnets.

* * * * *